3,198,277
LEVELING CONTROL FOR VEHICLE SUSPENSION
Mario Trivero, Corso 100, Cannoni 1,
Alessandria, Italy
Filed Dec. 10, 1962, Ser. No. 243,361
Claims priority, application Italy, Dec. 18, 1961,
23,029/61
5 Claims. (Cl. 180—41)

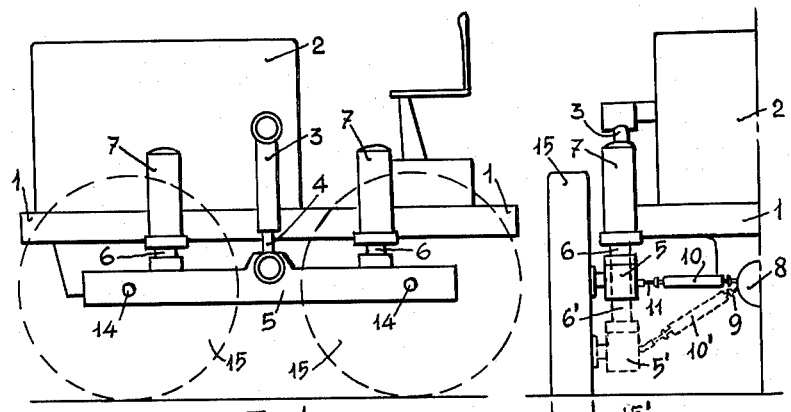
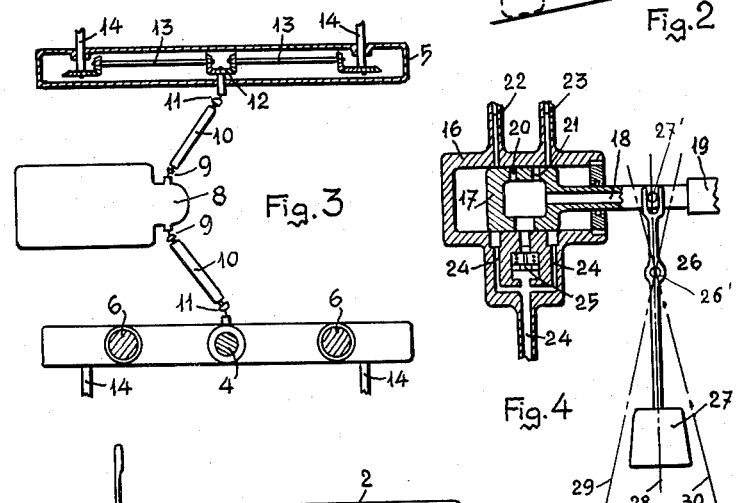
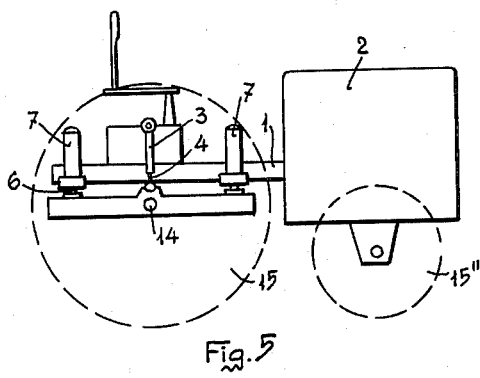

This invention relates to vehicles of the type suitable for movement over hilly ground and which have a suspension system which maintains the vehicle in a substantially horizontal plane notwithstanding variation in the terrain.

Vehicle suspension systems of the above-indicated type are generally actuated by manually operated mechanisms, so that compliance with the above conditions is dependent upon the alertness, quickness and efficiency of the operator. Further, in displacing the wheels vertically, it is at present necessary to make the axles of the wheels rotate about parallel axes so that, when the vehicle moves in a direction transverse to a slope and the direction is to be changed, the movement of the wheels necessary for their vertical displacement, requires a temporary support of the vehicle on the ground on only two points, which may easily cause the vehicle to overturn.

In order to transmit motion to the wheels, it has been necessary to employ complex mechanical driving gears, and it has subsequently been preferred to have said driving gears replaced by hydraulic transmissions, which, however, cause the vehicles to be very expensive.

The general object of the present invention is to provide a vehicle suspension system overcoming the above disadvantages.

The present invention consists in a vehicle of the type set forth, having at least two wheels, one on each side of the vehicle, which are connected to the vehicle by means of displaceable wheel support units or bearing members hereinafter referred to simply as bearings, acted upon by hydraulic pistons along axes perpendicular to the chassis frame of the vehicle. The bearings are guided by at least one cylindrical guide member moving in suitable guides or casings.

Preferably two bearings are applied to the wheels arranged on both sides of the vehicle.

Conveniently the wheels, arranged on each bearing, are connected to each other through gearing, so that they all act as driving wheels. In another embodiment of the invention only the rear driving wheels are connected to the bearings.

Conveniently the hydraulic pistons controlling the rectilinear motion of the bearings vertically are actuated reciprocatingly, when necessary, through a valve distributing fluid under pressure. The valve acts automatically with the varying of the slope of the ground or variations in terrain.

It is another feature of the invention that the valve distributing the fluid under pressure is actuated through a lever. An arm of which is kept in a vertical position by a weight arranged on its lower free end, such that, for each transverse leaning or tilting of the vehicle, the lever rotates in the opposite direction and acts on the distributing valve so as to actuate the piston connected to the bearing in the downstream position of the tilt. The bearing moves downwards returning the chassis frame of the vehicle to the substantially horizontal position. The distributing valve comprises appropriate passage ports such that, with the varying of the slope of the ground, the fluid under pressure is conveyed to one hydraulic piston and cylinder, while any fluid in the other hydraulic piston and cylinder is released.

Another feature of the invention is that the transmission to the wheels is effected mechanically by means of drive shafts provided with a double articulation and which are retractible telescopically.

Two diagrammatic embodiments of the invention will now be described, by way of example only, with reference to the accompanying drawings, wherein FIG. 1 is a diagrammatic side elevation view of the vehicle, in which the wheels have been indicated by dotted lines to allow a clear view of the portions lying behind;

FIG. 2 is a half front elevation view of the vehicle shown in FIG. 1, in which the position taken by the various portions when the ground slopes transversally is shown in dotted lines;

FIG. 3 is a diagrammatic plan view of the stabilizing system, partly in section taken just above a bearing and partly through another bearing, the parts shown being limited to the portions relating to the invention;

FIG. 4 is a diagrammatic fragmentary view illustrative of a distributing valve according to the invention; and FIG. 5 is a diagrammatic side elevation view of another embodiment of the invention.

With reference to FIGS. 1 to 4, the chassis frame 1 of a vehicle supports an engine or prime mover enclosed by a hood 2. A hydraulic cylinder 3 contains a piston 4 connected to a wheel support unit or bearing 5 which is connected to guide cylindrical members 6 arranged within casings or jackets 7 fixed perpendicularly to the chassis frame 1. A differential is contained in a casing 8 from which extends two short half-shafts articulated at 9 to telescopic shafts 10, which in turn are articulated at 11 to a bevel gear 12 which, by means of shafts 13 and second bevel gears, drives the axles 14 of wheels 15. A distributing valve 16 houses a piston 17 the rod of which has a bore 18 leading to an opening in the piston, the rod being connected to a flexible conduit 19 leading from the fluid compressing means (not shown) which supplies fluid under pressure for actuating the piston 4. Two ports 20 and 21 in the piston 17 can be aligned to communicate with their respective conduits 22 and 23 in the valve chamber 16, each conduit being connected with cylinder 3 and piston 4. Outlet conduit 24 is provided to lead fluid from piston 4, and 25 is the valve controlling the flow and thereby the pressure of the fluid. A lever 26 rotatable about a fixed pivot 26', and provided with a counterweight 27, can take up three working positions indicated by chain dotted lines 28 to 30 (see FIG. 4). The lever 26 is connected by a sliding connection 27'.

The operation of the above-described stabilizing device is as follows: When the vehicle moves, for instance, on substantially horizontal ground, the two bearings 5 will take up their positions close to the vehicle chassis frame 1, and the telescopic shafts 10 in their retracted positions will transmit the drive to the wheels 15. When the vehicle moves over ground having a slope transverse with respect to the direction of vehicle motion, the vehicle will pivot or lean in the direction of the slope. The weight 27 will then rotate about pivot 26' by gravity in the other direction, so as to move the lever 26 again into a vertical position. If, for instance, the weight 27 rotates towards its end position 29, the piston 17, connected through the sliding connection 27' to the lever 26, will slide to locate the conduit 22 first partially in communication with the recess of valve 16 and then with the discharge pipe 24. As the vehicle continues its movement, the port 21 of the piston 17 will communicate with conduit 23, which is thereby supplied with fluid under pressure which acts on the piston 4 connected thereto. This piston 4 will be extended out of its cylinder 3, pressing the bearing 5 downwards to the new position 15' (FIG. 2). In this way the vehicle chassis frame 1 is caused to pivot until reaching again its horizontal position. During the pivoting of the chassis frame 1, the lever 26 is rotated to the position 28, in which the conduits 22 and 23 are closed by the piston 17. The piston 4 is then prevented from moving in its cylinder and the vehicle moves with the wheels disposed at different heights. The telescopic shafts 10 and the articulations 9 and 11 allow the transmission of motion to the wheels independently of any position taken by the bearings 5. The vertical displacements of the pairs of lateral wheels have substantially no limits, because the telescopic shafts can be constructed from a number of lengths retractible within each other, and the cylinders 6 can be constructed with any height. When the transverse slope of the ground decreases, the lever 26 will pivot to the end position 30, moving the piston 17 to provide communication between conduit 23 and the discharge pipe 24, so that the fluid acting upon the piston 4 will flow out, and the piston will then retract again into its cylinder 3, thus maintaining the vehicle chassis frame 1 horizontal. If the vehicle then encounters ground having a slope in the opposite direction, the lever 26 will just pivot towards the position 30 aligning the port 20 of piston 17 with the conduit 22 of the other piston 4. In order to obtain a clearer understanding of the invention, various known devices suitable for rotating a pair of wheels 15 on a bearing 5 in a reverse direction, have been omitted from the drawings. The above mentioned devices may be easily applied to vehicles, even to those provided with front wheels having a different diameter relatively to the rear ones. One such embodiment is shown in FIG. 5, where the bearing 5 is limited to the rear driving wheels 15 having a larger diameter, than the front wheels, while the front wheels 15″ are freely rotatable. Such a vehicle when running on ground with a transverse slope is in contact with the ground only at three points, that is with the wheels 15″ which are higher up the slope and the driving wheels 15 arranged at different heights with respect to each other. When the vehicle encounters ground having a slope transverse to its direction of travel and must change direction, it is not subjected to the danger of overturning, since the motion of the bearing 5 is substantially vertical so as to always keep a three point contact with the ground.

Many modifications and changes may be made in embodying the invention. For instance it is possible to arrange on each side of the vehicle two separate bearings so as to control separately each wheel, and also it is possible to apply known means to the controlling valve 25 (FIG. 4), to prevent the distributor from working when it is not required.

What I claim is:

1. In a vehicle, having a frame, a pair of wheels on opposite sides of said frame, the improvement which comprises a vehicle suspension system comprising a bearing member on each side of the vehicle, means mounting said pair of wheels for vertical movement under control of a respective one of the bearing members, for each bearing member means comprising a cylinder comprising a fluid-actuated piston for varying the vertical height between the axis of rotation of the individual wheels and said frame, each piston having a downwardly extending connecting rod connecting each piston to a respective bearing member, fixed guide means on said frame for guiding the up and down movement of said bearing members, upright guide members received in said guide means on said frame for axial movement therein vertically for guiding the vertical travel of said bearing, members, sensing means for sensing of deviations of said frame from a horizontal position, and means comprising a single distributor valve actuated by said sensing means for distributing fluid under pressure to bottom of said cylinders individually and only alternatively in dependence upon which bearing member is to be lowered relative to said frame to maintain said frame horizontal.

2. In a vehicle, having a frame, a pair of wheels on opposite sides of said frame, the improvement which comprises a vehicle suspension system comprising a bearing member on each side of the vehicle, means mounting said pair of wheels for vertical movement under control of a respective one of the bearing members, for each bearing member means comprising a cylinder comprising a fluid actuated piston for varying the vertical height between the axis of rotation of the individual wheels and said frame, each piston having a downwardly extending connecting rod connecting each piston to a respective bearing member, fixed guide means on said frame for guiding the up and down movement of said bearing members, upright guide members received in said guide means on said frame for axial movement therein vertically for guiding the vertical travel of said bearing member, sensing means for sensing of deviations of said frame from a horizontal position, means comprising a single distributor valve actuated by said sensing means for distributing fluid under pressure to both of said cylinders individually and only alternatively in dependence upon which bearing member is to be lowered relative to said frame to maintain said frame horizontal, and said sensing means comprising an oscillatable weight operably connected to said distributor valve.

3. In a vehicle, having a frame, a pair of wheels on opposite sides of said frame, the improvement which comprises a vehicle suspension system comprising a bearing member on each side of the vehicle, means mounting said pair of wheels for vertical movement under control of a respective one of the bearing members, for each bearing member means comprising a cylinder comprising a fluid actuated piston for varying the vertical height between the axis of rotation of the individual wheels and said frame, each piston having a downwardly extending connecting rod connecting each piston to a respective bearing member, fixed guide means on said frame for guiding the up and down movement of said bearing members, upright guide members received in said guide means on said frame for axial movement therein vertically for guiding the vertical travel of said bearing members, sensing means for sensing of deviations of said frame from a horizontal position, means comprising a single distributor valve actuated by said sensing means for distributing fluid under pressure to both of said cylinders individually and only alternatively in dependence upon which bearing member is to be lowered relative to said frame to maintain said frame horizontal, driving means on the vehicle for driving said wheels, said driving means including means connected to said wheels to allow movement of said wheels and bearing means substantially vertically relative to said vehicle frame.

4. In a vehicle, having a frame, a pair of wheels on opposite sides of said frame, the improvement which comprises a vehicle suspension system comprising a bearing member on each side of the vehicle, means mounting said pair of wheels for vertical movement under control of a respective one of the bearing members, for each bearing member means comprising a cylinder comprising a fluid actuated piston for varying the vertical height between the axis of rotation of the individual wheels and said frame, each piston having a downwardly extending connecting rod connecting each piston to a respective bearing member, fixed guide means on said frame for guiding the up and down movement of said bearing members, upright guide members comprising cylindrical members received in said guide means on said frame for axial movement therein vertically for guiding the vertical travel of said bearing members, sensing means for sensing of deviations of said frame from a horizontal position, and means comprising a single distributor valve actuated by said sensing means for distributing fluid under pressure to both of said cylinders individually and only alternatively in dependence upon which bearing member is to be lowered relative to said frame to maintain said frame horizontal.

5. In a vehicle having a frame, a pair of wheels on opposite sides of said frame, the improvement which comprises a vehicle suspension system comprising a bearing member on each side of the vehicle, means mounting said pair of wheels for vertical movement under control of a respective one of the bearing members, for each bearing member means comprising a cylinder comprising a fluid actuated piston for varying the vertical height between the axis of rotation of the individual wheels and said frame, each piston having a downwardly extending connecting rod connecting each piston to a respective bearing member, fixed guide means on said frame for guiding the up and down movement of said bearing members, upright guide members received in said guide means on said frame for axial movement therein vertically for guiding the vertical travel of said bearing members, sensing means for sensing of deviations of said frame from a horizontal position, means comprising a single distributor valve actuated by said sensing means for distributing fluid under pressure to both of said cylinders individually and only alternatively in dependence upon which bearing member is to be lowered relative to said frame to maintain said frame horizontal, and including means to maintain each of said pistons in a stationary condition during the travel of the other piston.

References Cited by the Examiner

UNITED STATES PATENTS

| | | | |
|---|---|---|---|
| 2,110,809 | 3/38 | Murphy | 280—112 |
| 2,165,617 | 7/39 | Paes et al. | 280—112 X |
| 2,278,081 | 3/42 | Kramer | 280—6.1 |
| 2,757,373 | 7/56 | Marrie | 180—49 X |

A. HARRY LEVY, *Primary Examiner.*

LEO FRIAGLIA, *Examiner.*